(Model.)
W. F. THROCKMORTON.
HEDGE TRIMMER.
No. 265,182. Patented Sept. 26, 1882.
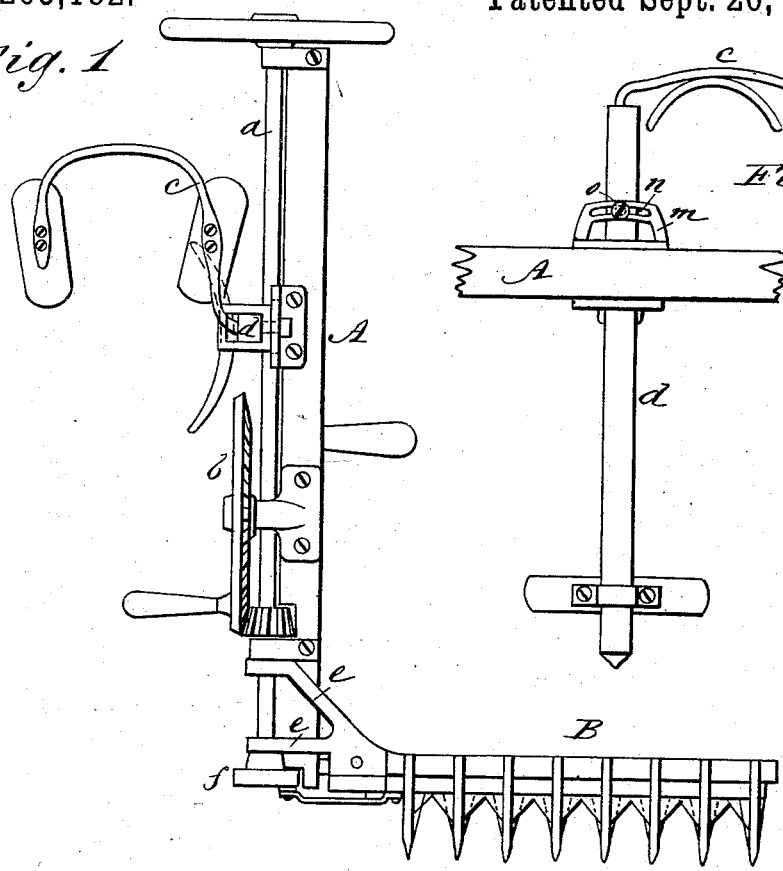
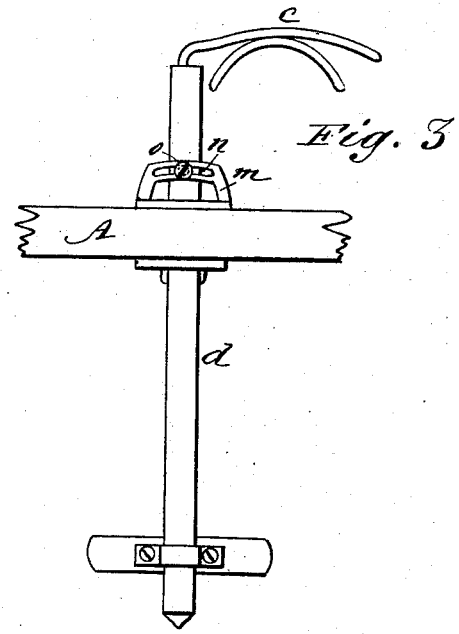
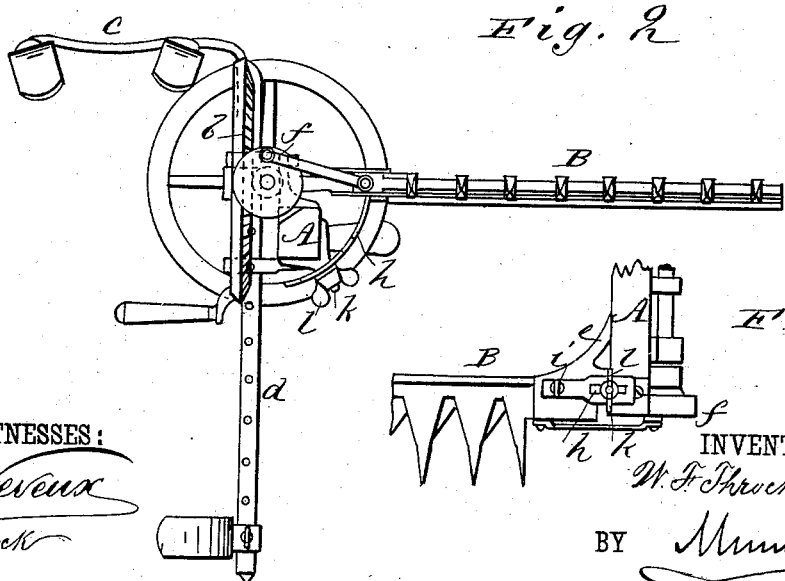
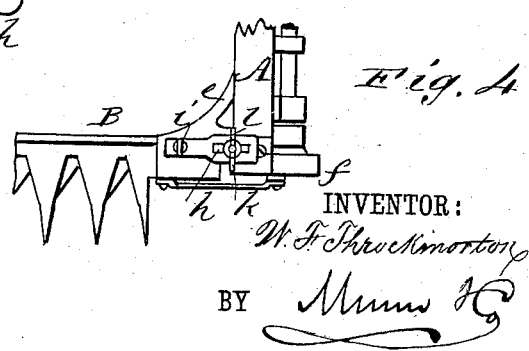
WITNESSES:
C. Neveux
C. Sedgwick
INVENTOR:
W. F. Throckmorton
BY Munn & Co
ATTORNEYS.

UNITED STATES PATENT OFFICE.

WILLIAM F. THROCKMORTON, OF ADAIR, ILLINOIS.

HEDGE-TRIMMER.

SPECIFICATION forming part of Letters Patent No. 265,182, dated September 26, 1882.

Application filed August 11, 1882. (Model.)

*To all whom it may concern:*

Be it known that I, WILLIAM F. THROCKMORTON, of Adair, in the county of McDonough and State of Illinois, have invented a new and Improved Hedge-Trimmer, of which the following is a full, clear, and exact description.

My improvements relate to hedge-trimmers of the class shown in Letters Patent granted to me June 27, 1882, No. 260,255, in which machine a cutter-bar is attached to a handle and fitted for operation by a crank.

The present invention consists in the means for attaching and holding the cutter-bar with the object to allow of its adjustment for trimming either the top or the sides of the hedge, and also in an improvement in the stirrup or clevis uniting the handle and the adjustable bar carrying the support for the machine, as hereinafter described and claimed.

Reference is to be had to the accompanying drawings, forming a part of this specification, in which similar letters of reference indicate corresponding parts in all the figures.

Figure 1 is a plan view of my improved hedge-trimmer. Fig. 2 is an end view of the same. Fig. 3 is a detail view, showing the device for supporting the apparatus. Fig. 4 is a detail view, showing the device for holding the cutter-bar in place.

A is the handle, fitted with a shaft, $a$, crank-wheel $b$ for operating the shaft, and a yoke or hook, C, carried by an adjustable bar, $d$, for supporting the apparatus upon the shoulders of the operator, all as shown in the Letters Patent aforesaid.

B is the cutter-head, hung upon the shaft $a$ by the forked arms $e\ e$, and fitted with the cutter-bar, that is connected by a rod to a crank-wheel, $f$, on the end of the shaft $a$. This construction allows the cutter-bar to be placed in a horizontal position, as shown in Fig. 1, for trimming the top of the hedge, and also to be turned over and hung perpendicularly for trimming the sides of the hedge.

Near the inner end of the head B a strap or brace, $h$, is attached by a set-screw, $i$, and this strap is slotted at its outer end to pass upon a screw-pin, $k$, that is fitted on the handle A. The pin $k$ is provided with a nut, $l$, for clamping the strap, so that the cutter-head can be held in position as adjusted.

When the device is to be used for trimming the sides of a hedge set-screw $i$ is to be taken out, and the head B may then be reversed in position—that is, turned entirely over, allowing the cutter-bar to hang perpendicularly, braced by the strap or brace $h$, which strap or brace, by loosening the nut $l$ and removing the bolt $i$, can be reversed for this purpose. This construction allows the apparatus to be used in either manner as described when supported from the shoulders of the operator without changing the position of the bar $d$ and supporting device $c$ for the adjustment of the bar $d$ with relation to the handle A. I provide the clevis $m$, having a segmental slot, $n$, through which the screw $o$ passes into the bar $d$ for securing the parts in place, by which devices the position of the handle A with relation to said bar $d$ may be regulated as required.

Having thus described my invention, I claim as new and desire to secure by Letters Patent—

1. In hedge-trimmers, the clevis $m$, having segmental slot $n$, in combination with the handle A, bar $d$, and screw $o$, substantially as shown and described.

2. In hedge-trimmers, the combination of the strap or brace $h$ and the clamping-nut $l$ with the handle A, and cutter-head B, hinged by arms $e$ upon the driving-shaft, substantially as and for the purpose set forth.

WILLIAM F. THROCKMORTON.

Witnesses:
 WM. L. CLAYTON,
 L. F. POUTIOUS.